US00RE37632E

(19) United States
(12) Reissued Patent
Bouchauveau et al.

(10) Patent Number: US RE37,632 E
(45) Date of Reissued Patent: Apr. 9, 2002

(54) FUEL PUMP

(75) Inventors: Pierre Bouchauveau, Blois; Dany Guillot, Huisseau/Cosson; Claude Leveque, Mont Pies Chambord, all of (FR)

(73) Assignee: Delphi Technologies Inc., Troy, MI (US)

(21) Appl. No.: 09/414,191

(22) Filed: Oct. 7, 1999

Related U.S. Patent Documents

Reissue of:
(64) Patent No.: 5,850,817
Issued: Dec. 22, 1998
Appl. No.: 08/757,911
Filed: Nov. 27, 1996

(30) Foreign Application Priority Data

Nov. 29, 1995 (FR) ..... 95 14102

(51) Int. Cl.[7] ..... F02M 41/00; F02M 37/04
(52) U.S. Cl. ..... 123/458; 123/506; 123/450
(58) Field of Search ..... 123/450, 458, 123/506, 511

(56) References Cited

U.S. PATENT DOCUMENTS 818,197 A 8/1906 Bessiere
4,838,232 A * 6/1989 Wich ..... 123/506
5,103,792 A * 4/1992 Winkler et al. ..... 123/506
5,313,924 A 5/1994 Regueiro
5,318,001 A * 6/1994 Djordjevic ..... 123/506
5,345,916 A * 9/1994 Amann et al. ..... 123/506
5,363,824 A * 11/1994 Bonse ..... 123/506
5,425,341 A * 6/1995 Connolly et al. ..... 123/450
5,462,029 A * 10/1995 Nicol ..... 123/450
5,546,906 A * 8/1996 Cooke ..... 123/506
5,564,394 A * 10/1996 Wood ..... 123/506
5,613,839 A * 3/1997 Buckley ..... 123/450

FOREIGN PATENT DOCUMENTS

DE 44 01 083 A 7/1995
DE 44 06 901 A 9/1995
FR 1176110 4/1959
GB 2156952 A 10/1985

* cited by examiner

*Primary Examiner*—Thomas N. Moulis
(74) *Attorney, Agent, or Firm*—Cantor Colburn LLP

(57) ABSTRACT

A fuel supply system for supplying fuel to the cylinders of an associated engine is disclosed. The system comprises a fuel pump for supplying high pressure fuel to a delivery line, a plurality of injectors connected to the delivery line and means operable to deliver fuel through the injectors to respective cylinders of an associated engine, and a control valve connected to the delivery line and operable to control the pressure of fuel within the delivery line.

9 Claims, 5 Drawing Sheets

FUEL PUMP

Matter enclosed in heavy brackets [ ] appears in the original patent but forms no part of this reissue specification; matter printed in italics indicates the additions made by reissue.

This invention relates to a system for supplying fuel at high pressure to the cylinders of an internal combustion engine. In particular, this invention relates to a fuel supply system of the type in which a fuel pump is arranged to supply fuel at high pressure to a delivery line in order to maintain the delivery line at high pressure. A plurality of injectors are connected to the delivery line, the injectors being individually controllable in order to inject fuel from the delivery line to the cylinders of an associated engine.

According to the present invention there is provided a fuel supply system comprising a fuel pump for supplying high pressure fuel to a delivery line, a plurality of injectors connected to the delivery line and means operable to deliver fuel through the injectors to respective cylinders of an associated engine, and a control valve connected to the delivery line and operable to control the pressure of fuel within the delivery line.

The fuel supply system conveniently further comprises a fuel control arrangement for controlling the supply of fuel to the fuel pump.

Preferably, the fuel pump is arranged to supply a relatively high number of pulses of high pressure fuel to the delivery line per operating cycle of the pump. Such an arrangement is advantageous in that the fuel pressure in the delivery line remains at a relatively uniform level, in use.

The invention will further be described, by way of example, with reference to the accompanying drawings, in which.

Figure 2:
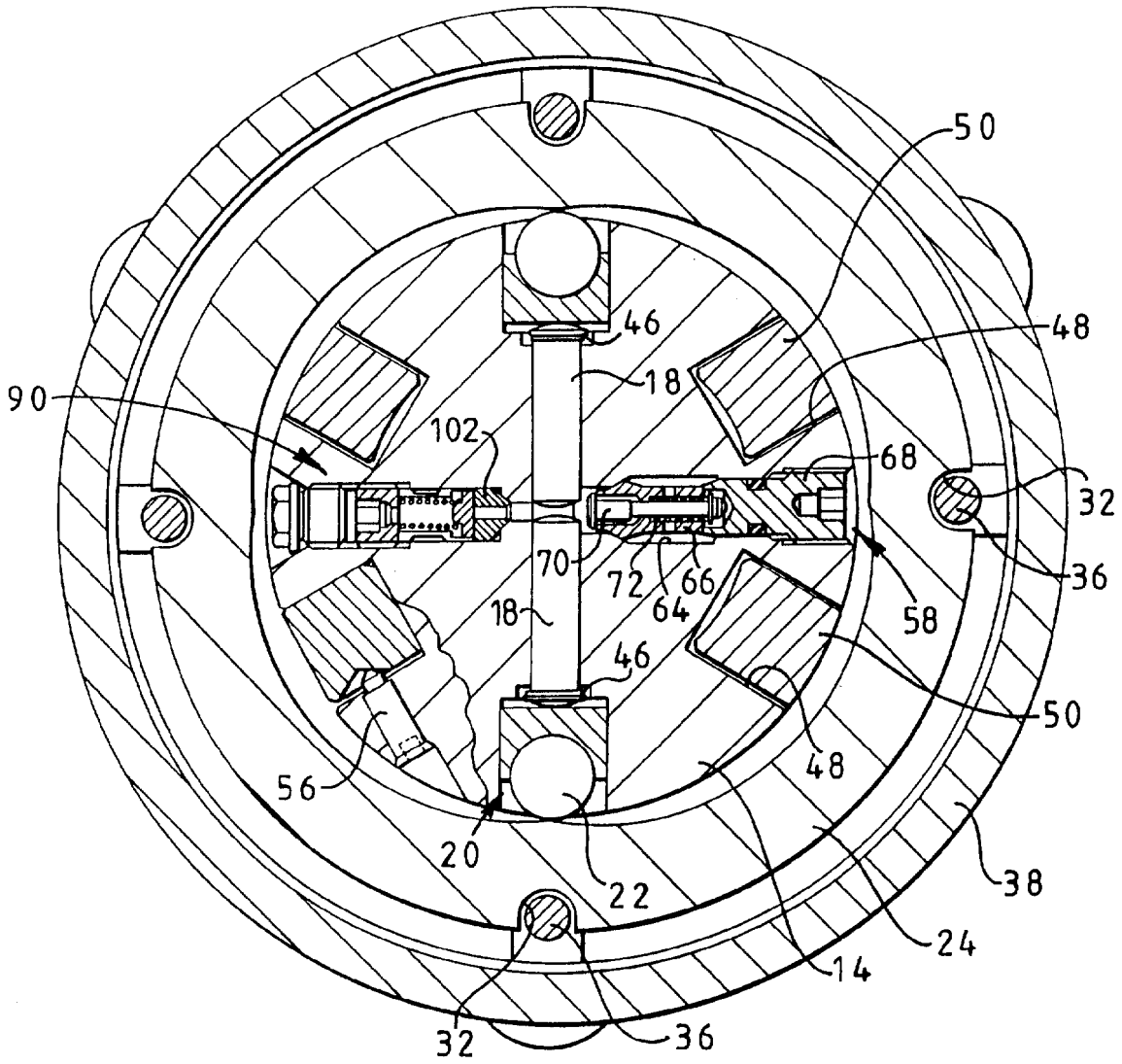
FIG. 2 is a cross-sectional view along the line 2—2 of FIG. 1.

The fuel supply system illustrated in the accompanying drawings comprises a fuel pump 10 to which fuel is supplied through a throttle arrangement 12. The fuel pump 10 comprises a generally cylindrical pump body 14 provided with three through bores 16a, 16b, 16c. The through bores 16 are axially spaced from one another, and are angularly spaced from one another by 60°. Two pumping plungers 18 are provided in each of the through bores 16, the plungers 18 being arranged to be reciprocable in the through bores 16. The outer end of each plunger 18 is arranged to engage a shoe and roller arrangement 20 the roller 22 of which is arranged to engage the cam surface of a rotary cam ring 24, the cam ring 24 including four equiangularly spaced cam lobes as shown in FIG. 2.

The cam ring 24 is connected to a drive shaft 26 which is arranged to be driven at a speed associated with engine speed, the drive shaft 26 being provided with a reduced diameter region 28 such that should the fuel pump 10 seize, the reduced diameter region 28 will shear thus restricting damage resulting from the seizure of the fuel pump 10.

The end of the drive shaft 26 facing the cam ring 24 is provided with an outwardly extending flange 30 which, adjacent its periphery, is provided with four equiangularly spaced, axially extending, screw threaded passages. The outer peripheral surface of the cam ring 24 is provided with four grooves 32 (see FIG. 2), each groove 32 aligning with one of the passages provided in the drive shaft flange 30. An annular support member 34 abuts the end of the cam ring 24 remote from the drive shaft 26, the member 34 and cam ring 24 being secured to the drive shaft 26 by means of four bolts 36, each bolt 36 extending through an aperture provided in the member 34, one of the grooves 32 provided in the cam ring 24 and engaging with the screw threads provided in the threaded passages of the drive shaft flange 30. The drive shaft 26 and member 34 are supported for rotation within a housing 38 by suitable bearings 40.

Each of the shoe and roller arrangements 20 is biased into engagement with the cam surface of the cam ring 24 by means of springs 42 housed within bores 44 provided in the pump body 14, the springs 42 conveniently taking the form of conical helical springs. In order to avoid excessive inward movement of the plungers 18, particularly when the pump has been at rest for some time, the outer end of each plunger 18 is provided with a recess within which a circlip 46 engages (see FIG. 2), the circlips 46 being arranged to engage the pump body 14 in order to limit inward movement of the plungers 18.

In order to maintain the alignment of the shoe and roller arrangements 20 with the plungers 18, in use, the pump body 14 is provided with six equiangularly spaced, axially extending grooves 48 as shown in FIG. 2. Each groove 48 houses one of the shoe and roller arrangements 20 thus restricting angular movement of the shoe and roller arrangements 20. In order to restrict axial movement of the shoe and roller arrangements 20, the parts of each groove 48 not occupied by the shoe and roller arrangements 20 are filled by means of insert pieces 50. The insert pieces 50 on the drive shaft side of each shoe and roller arrangement 20 are integral with an end cap 52 which is secured to the pump body 14 by means of bolts 54. Individual insert pieces 50 are provided in the parts of each groove 48 on the side of each shoe and roller arrangement 20 remote from the drive shaft, these insert pieces 50 being secured in position by individual set screws 56 as shown in FIG. 2.

Figure 1:
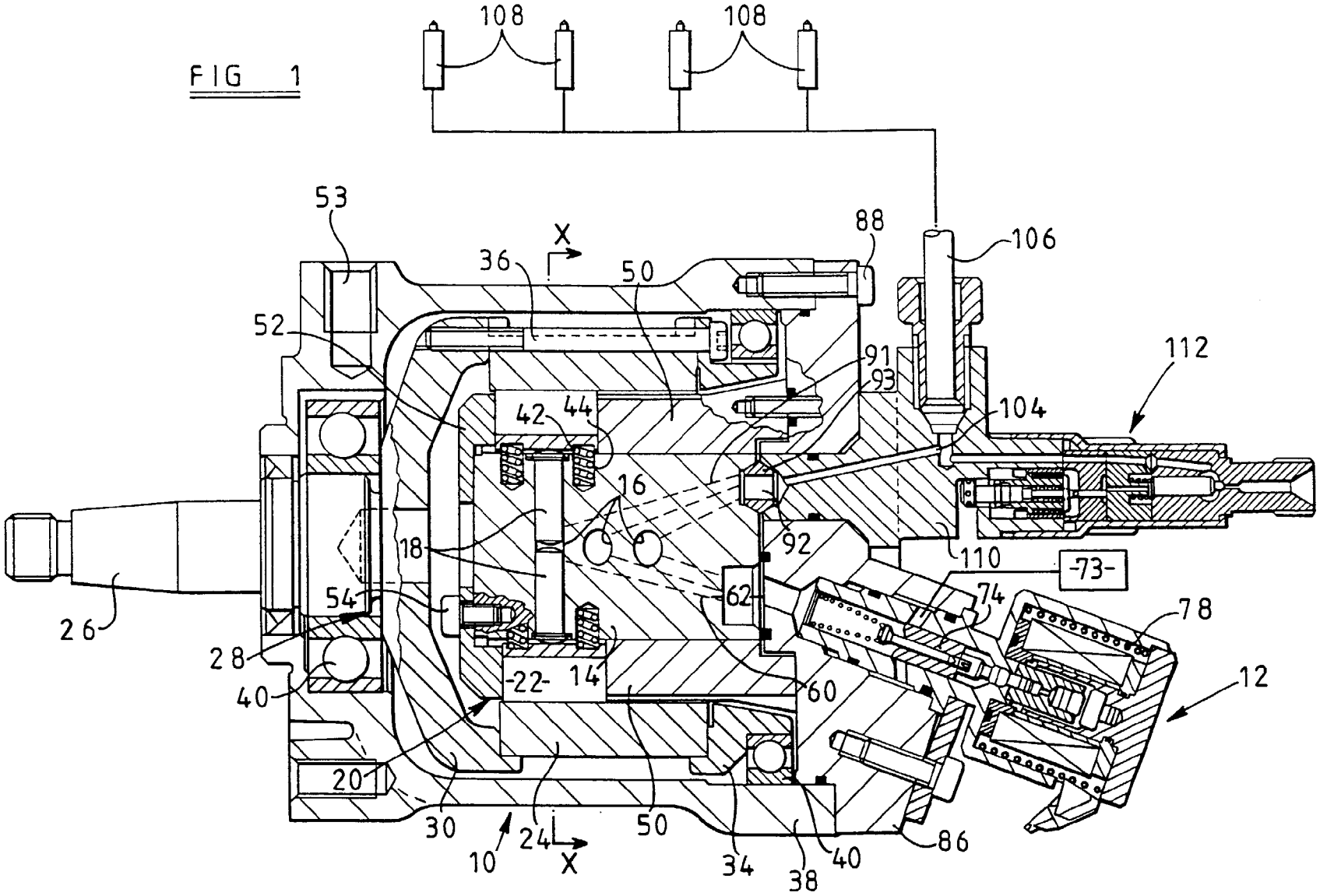
FIG. 1 is a diagrammatic cross-sectional view of a fuel supply system in accordance with an embodiment of the invention.

Each of the through bores 16 is connected through respective inlet non-return valves 58 and individual passages indicated by dashed lines 60 in FIG. 1 to an inlet port 62 provided at the end of the pump body 14 remote from the drive shaft 26. Each inlet valve 58 is provided within a respective bore 64 provided in the pump body 14, the outer end of the bore 64 being screw threaded. The inner end of the bore 64 communicates with the respective through bore 16, and is of reduced diameter, a valve body 66 sealingly engaging the surface of the bore 64. The valve body 66 is secured within the bore 64 by means of a screw threaded member 68 which sealingly engages the screw threaded region of the bore 64. The valve body 66 includes an axially extending passage within which a valve member 70 is reciprocable, the valve member 70 including, at its inner end, an enlarged head which is biased into engagement with a seating provided on the valve body 66 by means of a spring 72.

Figure 5:
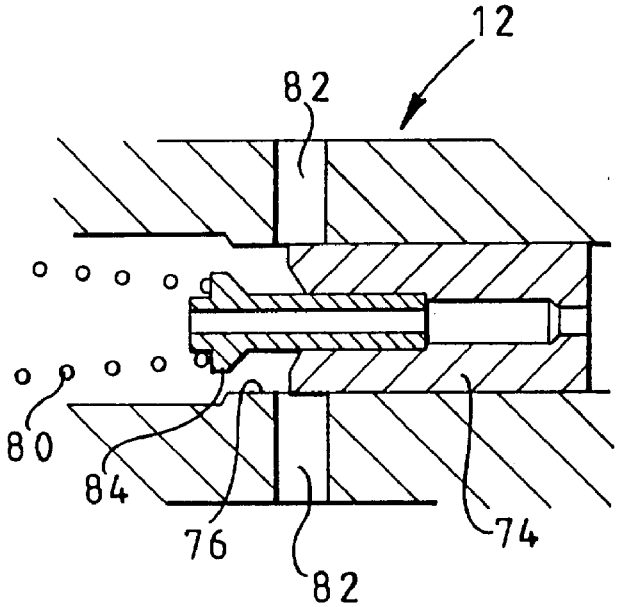
FIG. 5 is an enlarged view of another part of FIG. 1.

The throttle arrangement 12 referred to hereinbefore communicates with the inlet port 62. The throttle arrangement 12 includes a throttle member 74 which is axially adjustable within a bore 76 under the action of a solenoid actuator arrangement 78 which acts against a helical spring 80, conveniently a conical spring. As illustrated in FIG. 5, the throttle member 74 is moveable between a position in which it covers a plurality of inlets 82 which are arranged to receive fuel at a relatively low pressure from a suitable feed pump 73, and a position in which the inlets 82 are open thus permitting fuel to flow through the throttle arrangement 12 to the inlet port 62. The throttle member 12 includes an axially extending pin 84 defining a spring abutment with which the spring 80 engages to act against the solenoid. The pin 84 and throttle member 74 include axially extending passages which permit the fuel pressure to act upon both ends of the throttle member 74, thus the throttle member 74 is substantially pressure balanced. The presence of the pin 84 avoids fuel from the inlets 82 jetting around the spring 80, and thus avoids the instability that such jetting causes.

As illustrated in FIG. 1, the throttle arrangement 12 is secured to an end plate 86 which is secured to the housing 38 by means of bolts 88. Fuel from the feed pump 73 is also supplied to the interior of the housing 38 in order to provide lubrication for the bearings 40 and for the shoe and roller arrangements 20. A port 53 is provided in the housing to permit excess fuel to escape from the housing 38.

Figure 3:
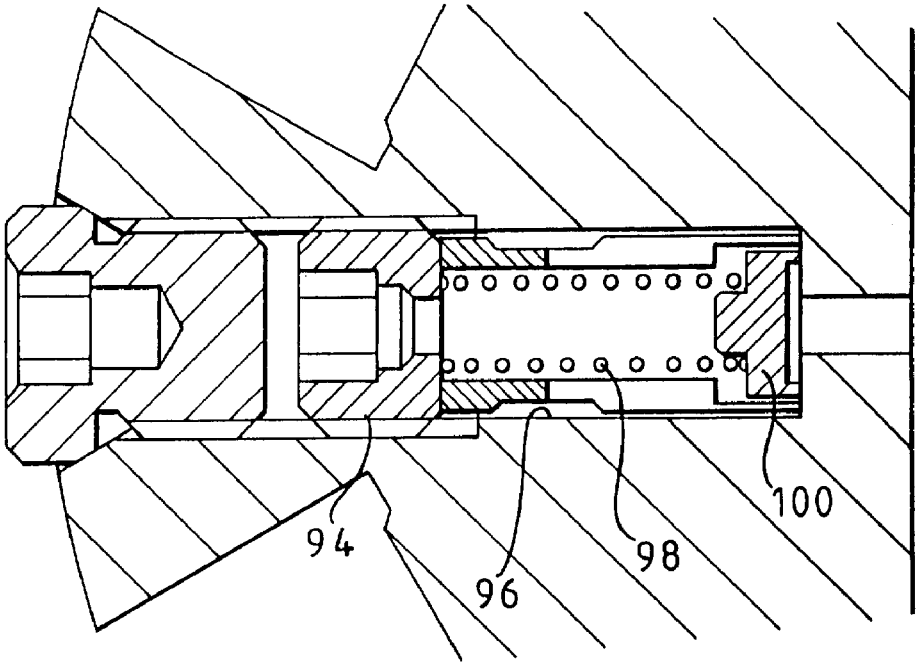
FIG. 3 is an enlarged view of a modification to a part of FIG. 2.

Each of the through bores 16 further communicates through respective outlet non-return valves 90 and passages denoted by dashed lines 91 in FIG. 1 with an outlet port 92 of the pump body 14. The outlet valves 90, as shown in FIG. 3, each comprise a valve body 94 which is in screw threaded engagement within a bore 96 which is diametrically opposite the inlet valve 58 of a respective through bore 16, the bore 96 communicating with the through bore 16. The valve body 94 includes a hollow cylindrical region housing a spring 98 which engages a valve member 100, biassing the valve member 100 into engagement with a seating formed in the bore 96. FIG. 2 includes a modification to the outlet valve illustrated in FIG. 3, the arrangement of FIG. 2 further including a seating member 102 which the valve member 100 engages and towards which the valve member 100 is biased. The valve body 94 in this arrangement includes a plurality of legs which engage with the seating member 102, securing the seating member 102 within the bore 96 so as to form a seal between the seating member 102 and the pump body 14.

The inlet and outlet valves 58, 90 are each located adjacent the through bores 16 in order to minimise the dead volume, and hence improve the efficiency of the pump. It will be recognised that the inlet and outlet valves may be replaced by any other suitable non-return valves.

The outlet port 92 communicates with a delivery passage 104 extending through the housing 110 of a control valve 112, the passage 104 communicating, in turn, with a delivery line 106. The connection between the outlet port 92 and the delivery passage 104 is subject to high pressure, and in order to ensure that a good seal is formed therebetween, a deformable olive 93 is provided in the outlet port 92.

As illustrated schematically in FIG. 1, the delivery line 106 communicates with a plurality of injection nozzles 108 each of which is arranged to supply fuel from the delivery line 106 to a cylinder of an associated engine.

Figure 4:
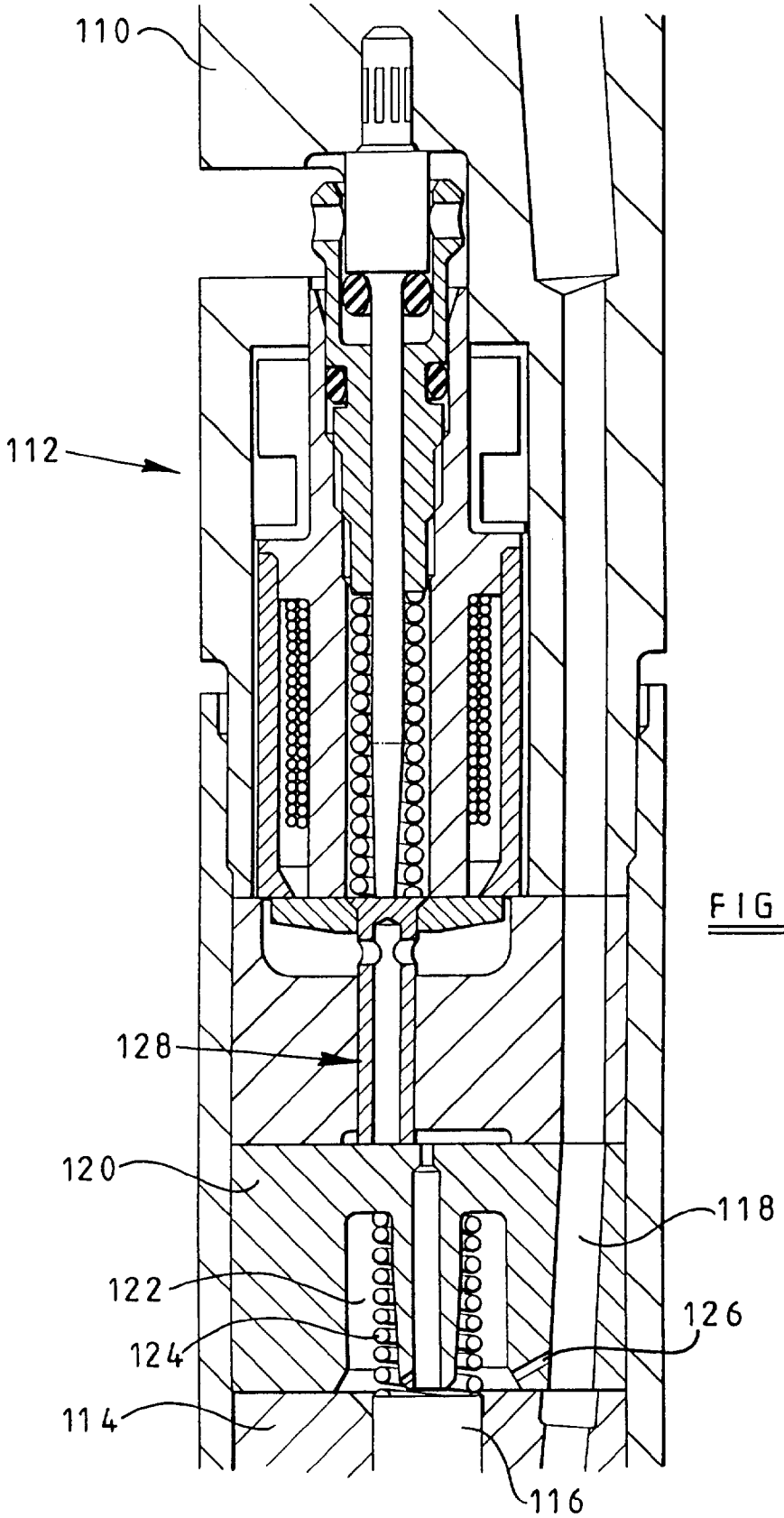
FIG. 4 is an enlarged view of part of FIG. 1.

As illustrated in FIGS. 1 and 4, the control valve 112 comprises a generally cylindrical valve body 114 having a bore extending therethrough, a valve member 116 being axially movable within the bore and engageable with a seating provided within the bore. The bore includes an annular gallery, the part of the valve member 116 extending within the gallery including an angled thrust surface against which high pressure fuel from the delivery passage 104 can act tending to lift the valve member 116 from the seating, high pressure fuel from the delivery passage 104 being supplied to the gallery through a supply line 118.

A distance piece 120 abuts the end of the valve body 114, the distance piece 120 defining a spring chamber 122 housing a spring 124 arranged to act against the end of the valve member 116 to bias the valve member 116 into engagement with the seating. The spring chamber 122 is supplied with fuel from the supply line 118 through a restricted passage 126. A solenoid actuated valve arrangement 128 communicates with the spring chamber 122 so that, on energization thereof, fuel from the spring chamber 122 escapes to a suitable low pressure drain thus the pressure of fuel acting on the end of the valve member 116 is reduced. Such a reduction in pressure results in a condition being reached beyond which the pressure of fuel acting against the thrust surface is sufficient to lift the valve member 116 from its seating against the action of the spring 124 and the force due to the pressure of fuel within the spring chamber 122. Once such movement of the valve member 116 has taken place, fuel from the delivery passage 104 can escape through the control valve 112 to a suitable low pressure drain.

When the solenoid actuator of the valve arrangement 128 is de-energised, the solenoid actuated valve 128 closes, thus the pressure of fuel within the spring chamber 122 rises, and a condition is reached beyond which the pressure within the spring chamber 122 and the spring force acting on the valve member 116 are sufficient to move the valve member 11 6 into engagement with the seating. Bleeding of fuel through the control valve 112 is therefore terminated.

Such a control valve 112 has a relatively fast response time, and in use it is operated to maintain the fuel pressure within the delivery line 106 at a relatively uniform level. If the pressure of fuel within the delivery line 106 exceeds a predetermined level, the control valve 112 is operated to allow fuel to escape therethrough until the pressure has fallen to an acceptable level.

In use, an appropriate quantity of fuel from the feed pump 73 is supplied through the throttle arrangement 12 to the inlet port 62 of the pump body 14. As shown in FIGS. 1 and 2, one of the pairs of plungers 18 occupies its innermost position. Rotation of the cam ring 24 results in the rollers 22 associated with these plungers 18 riding down the trailing flanks of the cam lobes, the shoe and roller arrangements 20 being biased outwardly by the springs 42. The fuel supplied to the inlet port 62 flows along the passages 60, through the inlet valve 58, the pressure of the fuel supplied by the feed pump 73 being sufficient to move the valve member 70 against the action of the spring 72, and enters the through bore 16 pushing the plungers outwardly.

Continued rotation of the cam ring 24 results in the next of the cam lobes engaging the shoe and roller arrangements 20 pushing the shoe and roller arrangements 20, and hence the plungers 18, inwardly. The inward movement of the plungers pressurizes the fuel within the through bore 16 such that the inlet valve 58 closes, the fuel being pumped out of the through bore 16 through the outlet valve 90. The fuel is supplied to the outlet port 92 of the pump body 14 through the passages 91 where it is supplied through the delivery passage 104 to the delivery line 106.

The other pairs of plungers 18 function in the same manner as described above, but are out of phase with the above described pair of plungers with the result that for each complete revolution of the cam ring 24, twelve pulses of fuel are supplied to the outlet port 92. The supply of such a relatively large number of pulses, a relatively small quantity of fuel being supplied in each pulse, results in the pressure of fuel within the delivery line remaining substantially constant.

Figure 6:
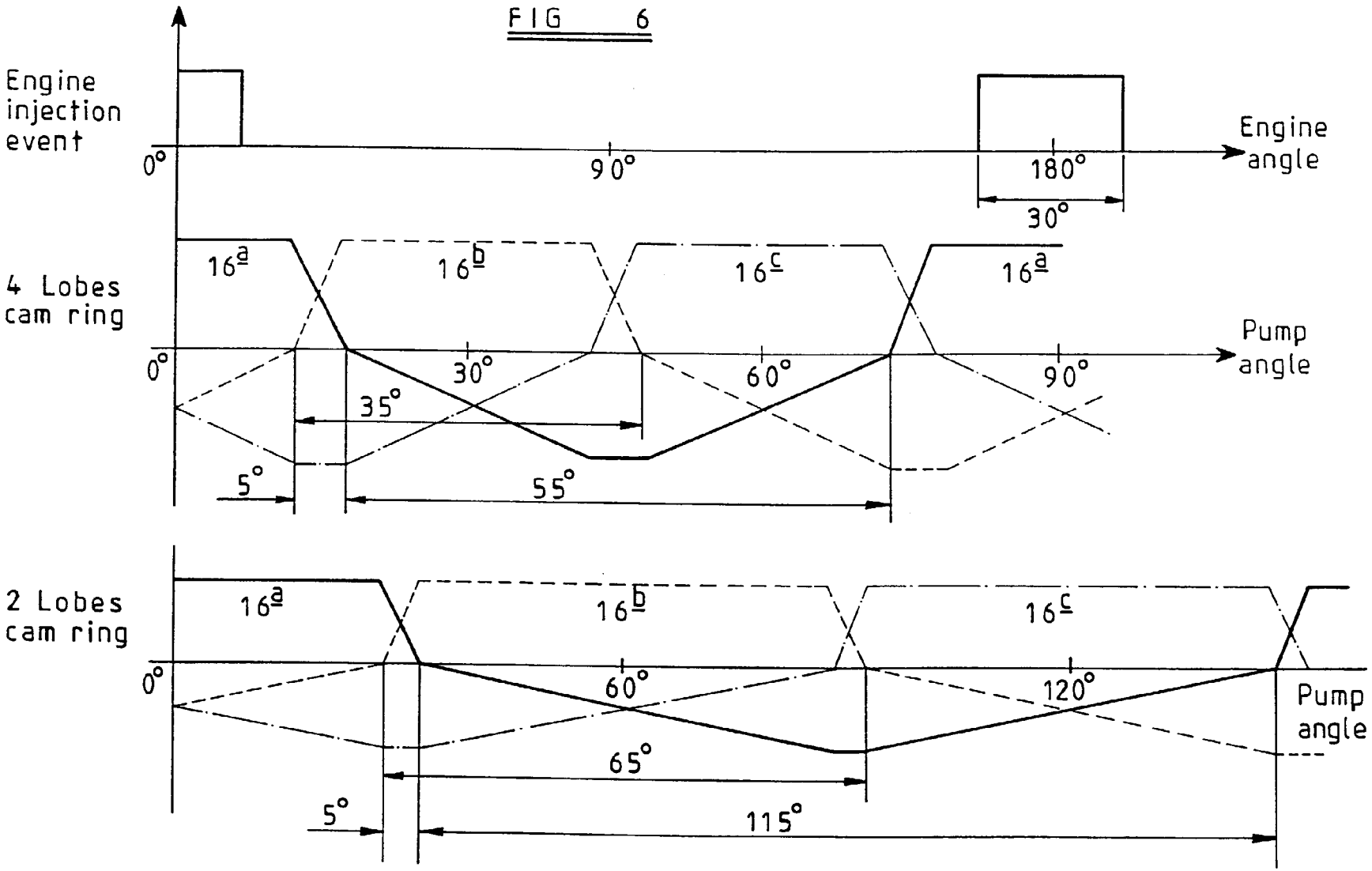
FIG. 6 is a cam rate diagram relating to the embodiment of FIG. 1.

Although the illustrated embodiment includes three pair of plungers and a cam ring having four equiangularly spaced cam lobes, it will be recognised that other arrangements are possible, but it is preferable for the relationship between the number of plungers and cam lobes to be such that a relatively high number of pulses of fuel are supplied to the delivery line during each revolution of the cam ring. FIG. 6 is a typical cam rate diagram which illustrates that there is some overlap between the end of pumping from one of the bores 16 and the commencement of pumping from another of the bores 16. FIG. 6 also includes a typical cam rate diagram for the case where the cam ring includes two cam lobes rather than four as described hereinbefore.

The supply of twelve pulses of fuel to the delivery line 106 per revolution of the cam ring 24 permits several pulses of fuel to be supplied between each injection of fuel to the cylinders of an associated engine. Conveniently, the fuel supply system is arranged such that one of the pulses is supplied at the commencement of each injection of fuel to the engine. Such an arrangement improves control of the pressure of fuel within the delivery line 106, particularly when the pump is operating below its maximum capacity.

In use, the throttle arrangement 12 is controlled so that the amount of fuel supplied therethrough is substantially equal to the quantity of fuel being delivered through the injection nozzles 108. The pressure of the fuel within the delivery line 106 is therefore maintained at a relatively constant level, and it is envisaged that this system will operate with fuel at a pressure of approximately 1600 Bar.

The presence of the springs 42 results in the rollers 22 remaining in contact with the cam surface both when the pump is operating at its maximum pumping capacity and when smaller quantities of fuel are being pumped. It is advantageous for such contact to be maintained as it results in the pump operating more quietly than is the case where the rollers 22 are allowed to leave the cam surface, for example when the pump is not operating at its maximum capacity. The presence of the springs 42 is also advantageous as the weight of the shoe and roller arrangements 20 is carried, at least in part, by the springs 42, thus the gravitational forces acting on the plungers due to the weight of the shoe and roller arrangements 20 are reduced.

Although the quantity of fuel supplied is controlled by the throttle arrangement 12, and the relatively large number of pulses results in the delivery line 106 being at a substantially constant pressure, there may be occasions where the pressure in the delivery line 106 rises unacceptably. In these circumstances, the control valve 112 is operated as described hereinbefore to bleed fuel from the delivery line 106, thus reducing the pressure until its falls within an acceptable range. In addition to, or as an alternative to,the control valve 1 12 acting as a trim valve as described hereinbefore, the control valve 112 may act as a safety release valve arranged to open when the pressure of fuel within the delivery line becomes unacceptably high in order to prevent or limit damage to the fuel supply system.

It will be recognised that the fuel system could operate without the throttle arrangement, the fuel pump being supplied with an unregulated supply of fuel, and hence operating at its maximum capacity at all times. The pressure of fuel within the delivery line would then regularly fall outside of the desired range, hence the control valve would be regularly bleeding fuel from the delivery line. It will be recognised that as this control valve bleeds fuel to a low pressure drain, such an arrangement would be inefficient compared to that described hereinbefore.

The injectors 108 may be of any suitable type, and are not described herein in detail. One particularly suitable type of valve is similar to the control valve described hereinbefore, the outlet of the valve defining a nozzle having one or more small apertures arranged to supply fuel to an injector of an associated engine. Alternatively, the injectors may be of the fuel pressure operable type, the supply of high pressure fuel thereto being controlled by a separate valve.

What is claimed is:

1. A fuel supply system comprising a fuel pump for supplying high pressure fuel to a common delivery line, a plurality of individually actuable injectors connected to the delivery line and control means associated with each injector operable to deliver fuel through the respective injector of an associated engine, and a control valve connected to the delivery line and operable to control the pressure of fuel within the delivery line, wherein the control valve comprises a housing defining a bore within which a valve needle is slidable, the valve needle being engageable with a seating to control fuel flow to an outlet, wherein the valve needle is moveable by fuel pressure exerted on said needle, which pressure is controlled by an electromagnetically actuable valve.

2. A fuel supply system as claimed in claim 1, wherein the electromagnetically actuable valve is arranged to control the fuel pressure within a control chamber, the valve needle of the control valve being influenced by the pressure within the control chamber.

3. A fuel supply system as claimed in claim 1, further comprising a fuel control arrangement for controlling the supply of fuel to the fuel pump.

4. A fuel supply system as claimed in claim 1, wherein the fuel pump comprises a pump body provided with a radially extending bore, a pumping plunger being reciprocable within the bore under the action of a cam surface provided on a cam ring which is rotatable relative to the pump body, the bore communicating through an inlet valve with a source of fuel, and through an outlet valve with the delivery line.

5. A fuel supply system as claimed in claim 4, wherein the inlet and outlet valves are provided in respective radially extending drillings provided in the pump body.

6. A fuel supply system as claimed in claim 1, wherein during the time between the commencement of a first injection and the commencement of the next injection a plurality of pulses of fuel at high pressure are supplied to the delivery line.

7. A fuel supply system as claimed in claim 6, wherein during the time between the commencement of a first injection and the commencement of the next injection, at least three pulses of fuel are supplied to the delivery line.

8. A fuel supply system as claimed in claim 7, wherein one of the pulses is supplied to the delivery line at the commencement of the first injection.

9. A fuel supply comprising:

(a) A fuel pump supplying high-pressure fuel to a delivery line, the fuel pump having a pump body provided with a radially extending bore, a pumping plunger, being reciprocable within the bore under the action of a cam surface provided on a cam ring which is rotable relative to the pump body, the bore communicating through an inlet valve with a source of fuel, and through an outlet valve with the delivery line wherein the inlet and outlet valves are provided in respective radially extending drillings provided in the pump body;

(b) A plurality of injectors operably connected to the delivery line, such that fuel is deliverable through the injectors to respective cylinders of an associated engine;

(c) A control valve connected to the delivery line and operable to control the pressure of fuel within the delivery line.

* * * * *